A. FAY.
MECHANICAL MOVEMENT.
APPLICATION FILED OCT. 10, 1910.

1,329,387.

Patented Feb. 3, 1920.
6 SHEETS—SHEET 1.

WITNESSES:

INVENTOR.

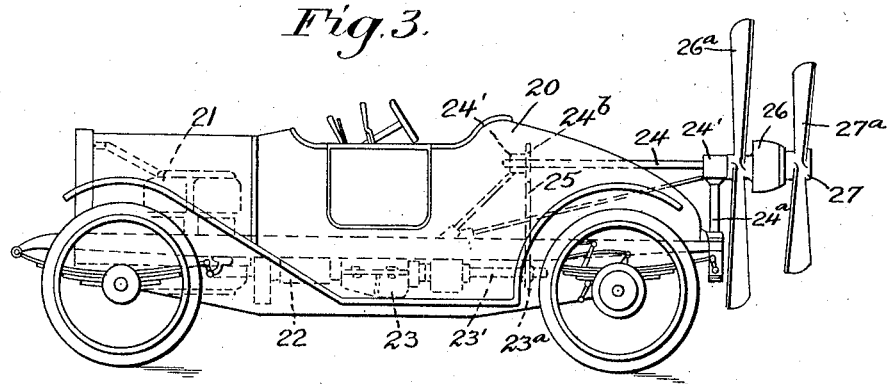
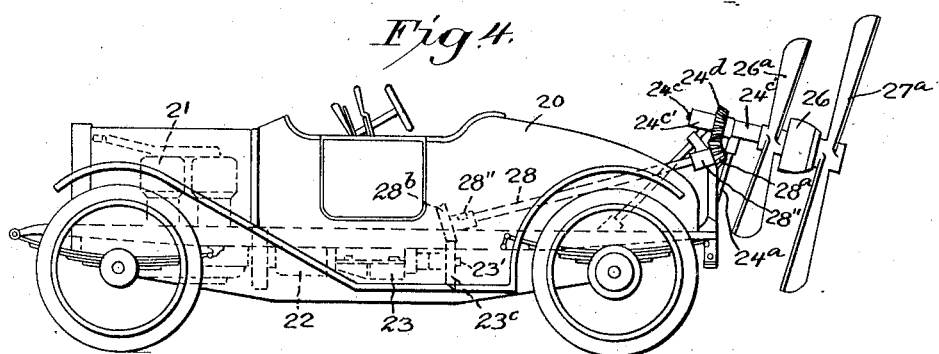
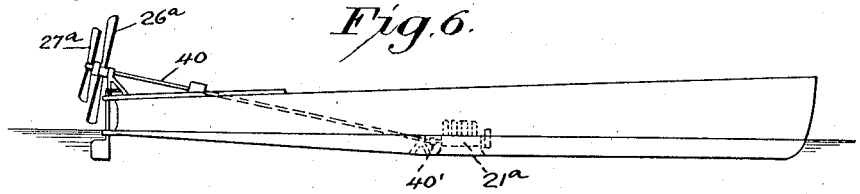
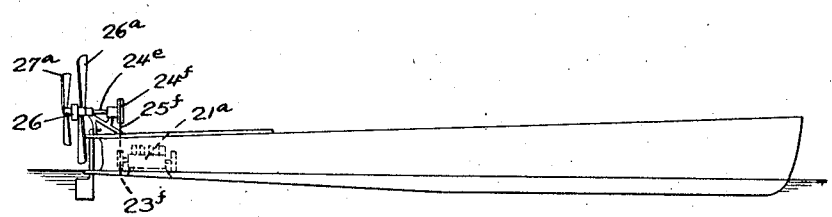

A. FAY.
MECHANICAL MOVEMENT.
APPLICATION FILED OCT. 10, 1910.

1,329,387.

Patented Feb. 3, 1920.
6 SHEETS—SHEET 3.

WITNESSES:

INVENTOR.

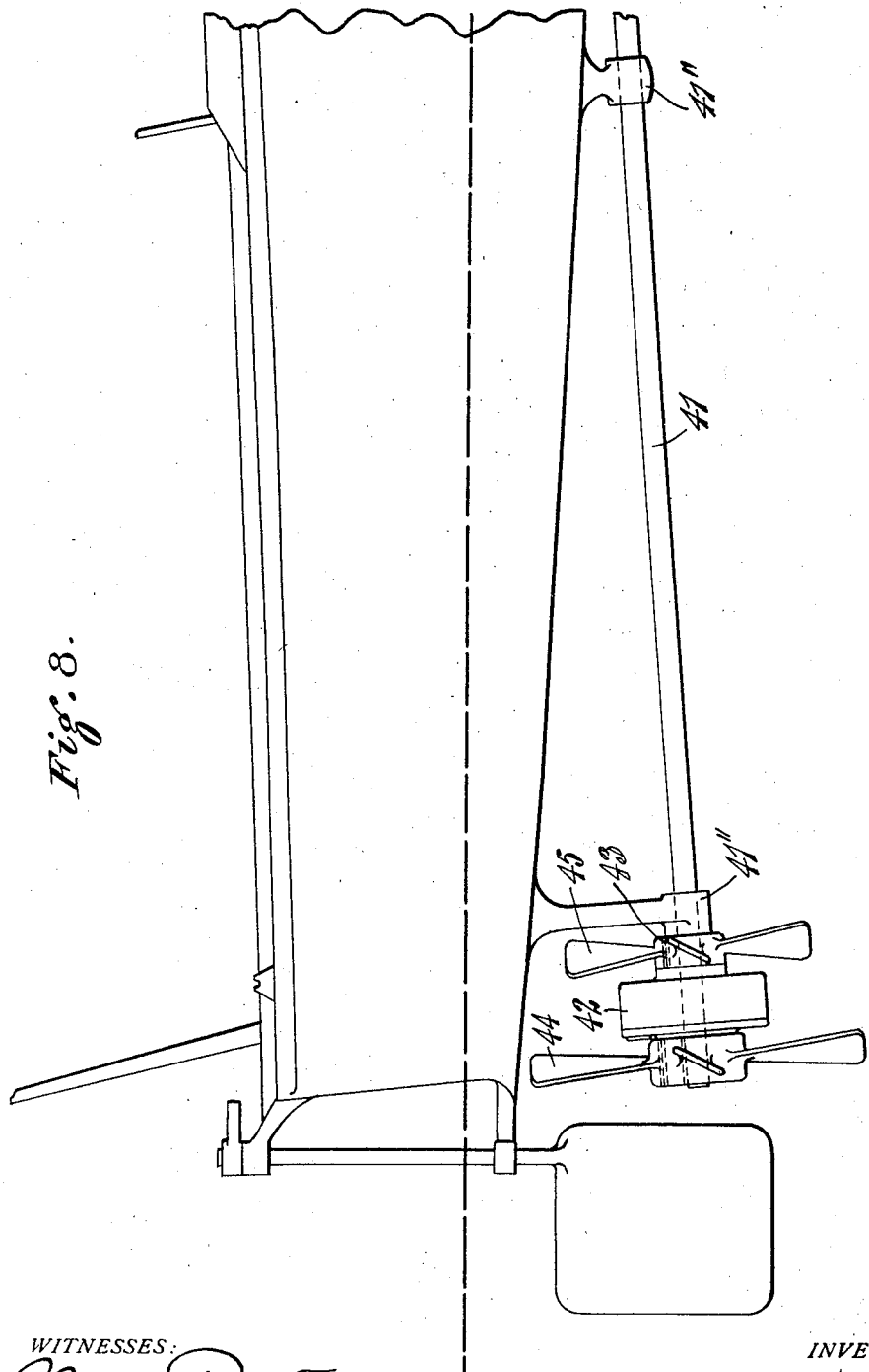

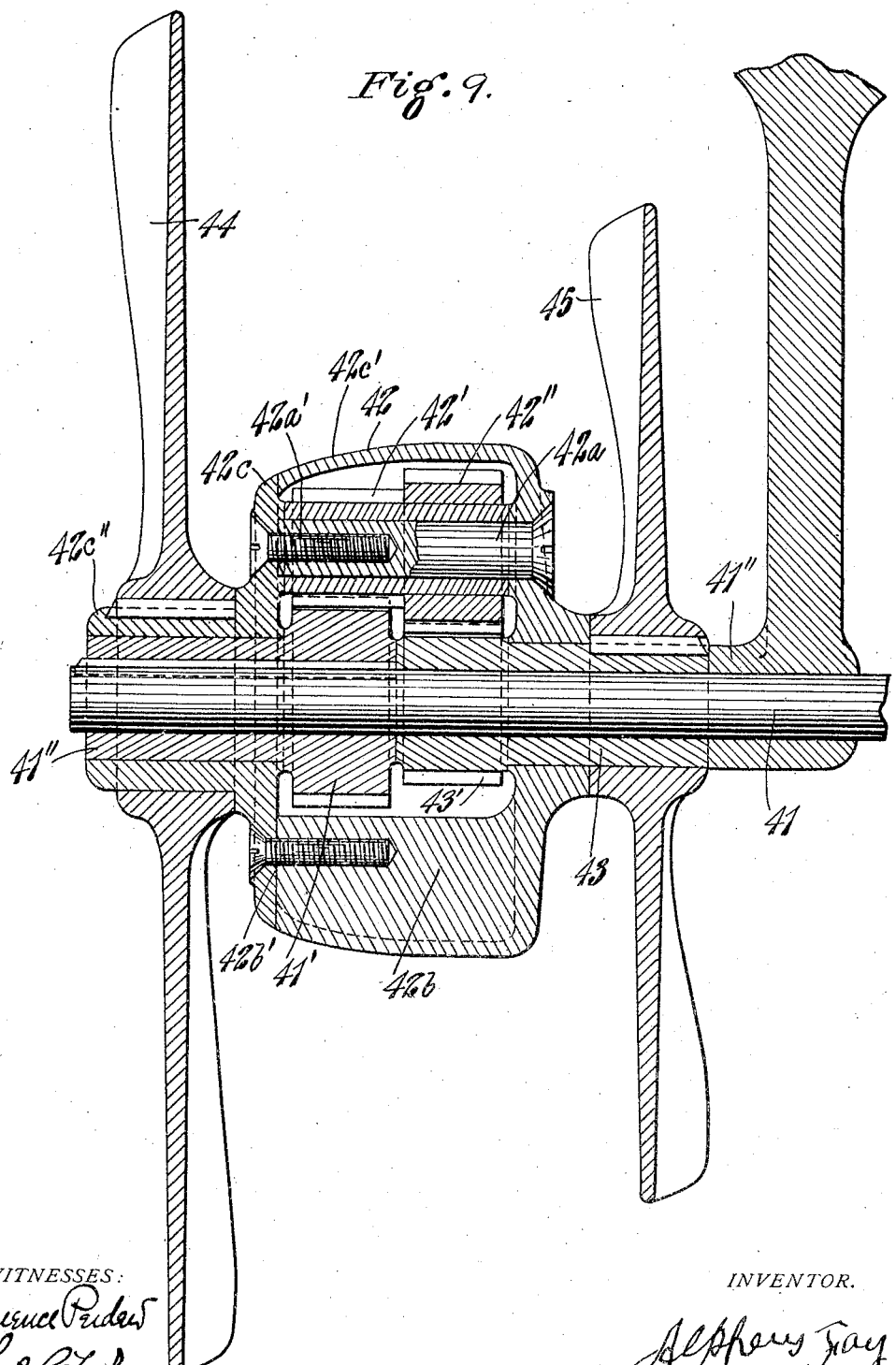

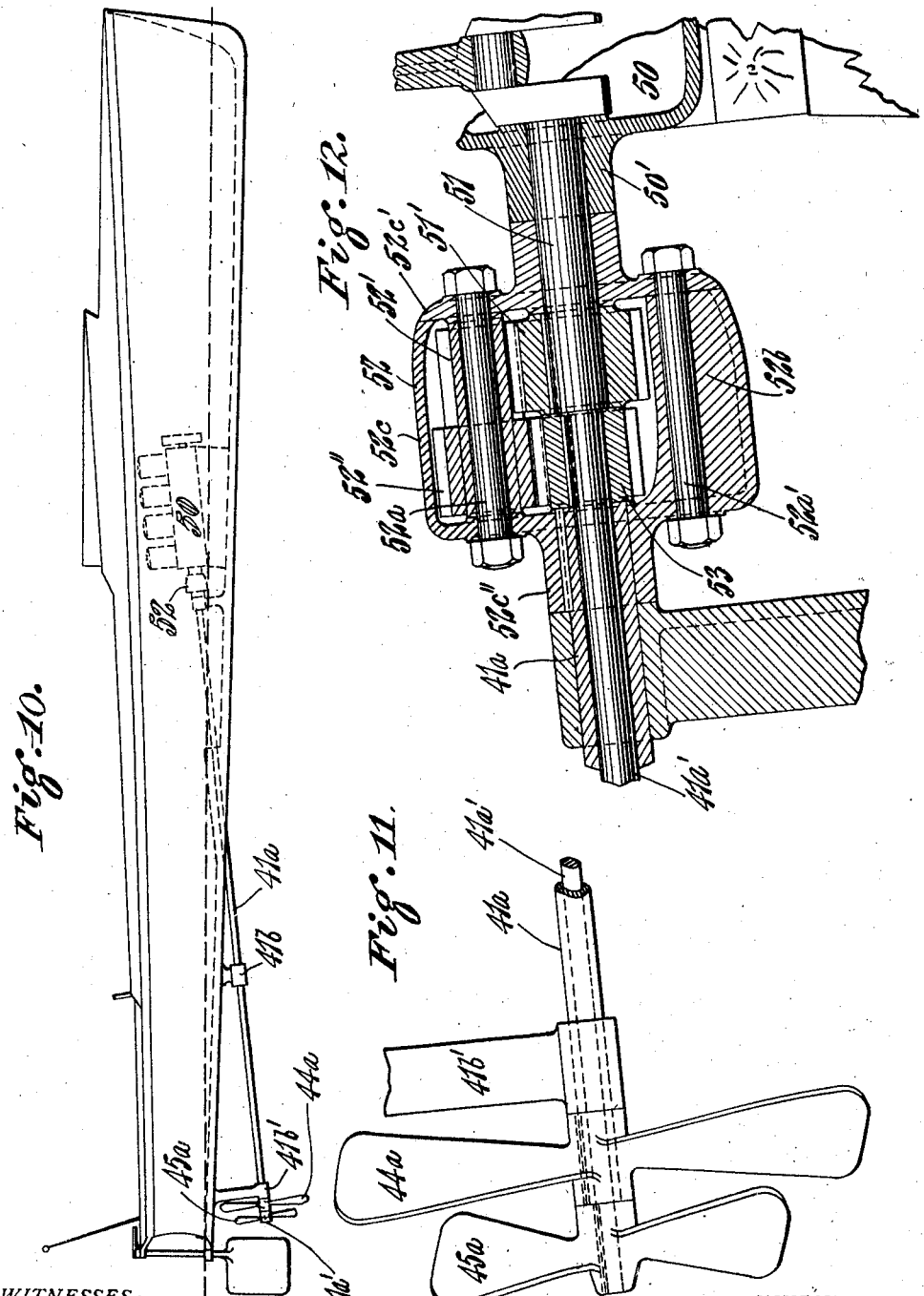

UNITED STATES PATENT OFFICE.

ALPHEUS FAY, OF LOUISVILLE, KENTUCKY.

MECHANICAL MOVEMENT.

1,329,387.  Specification of Letters Patent.  Patented Feb. 3, 1920.

Application filed October 10, 1910. Serial No. 586,417.

*To all whom it may concern:*

Be it known that I, ALPHEUS FAY, a citizen of the United States, residing at Louisville, in the county of Jefferson and State of Kentucky, have invented a certain new and useful Mechanical Movement, of which the following is a specification.

My invention relates to machine elements, and has for its object the provision of a more efficient device for the utilization of energy in performing work.

My invention consists in the combination of two operative members, one of which, under like actuation, is of greater operative capacity than the other, and means for variably actuating said members, with a tendency to equalize the work done by the one with respect to the work done by the other.

Figure 1:
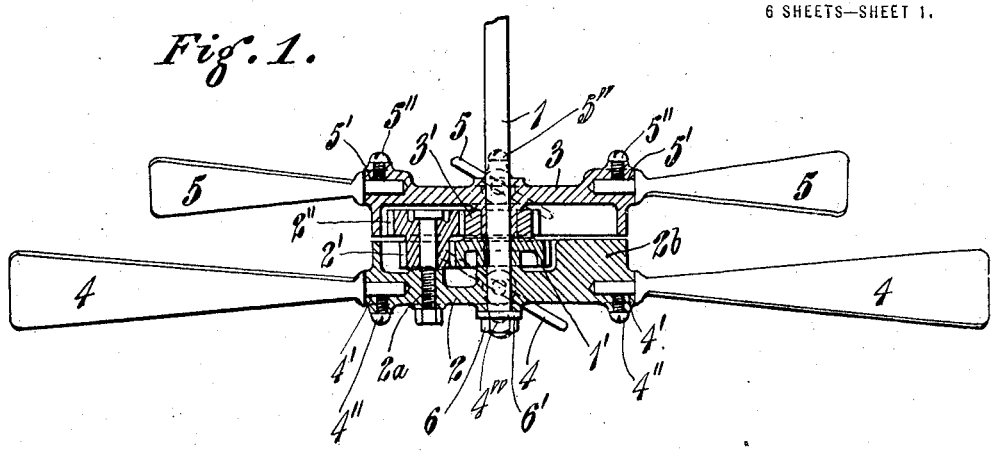
Figure 2:
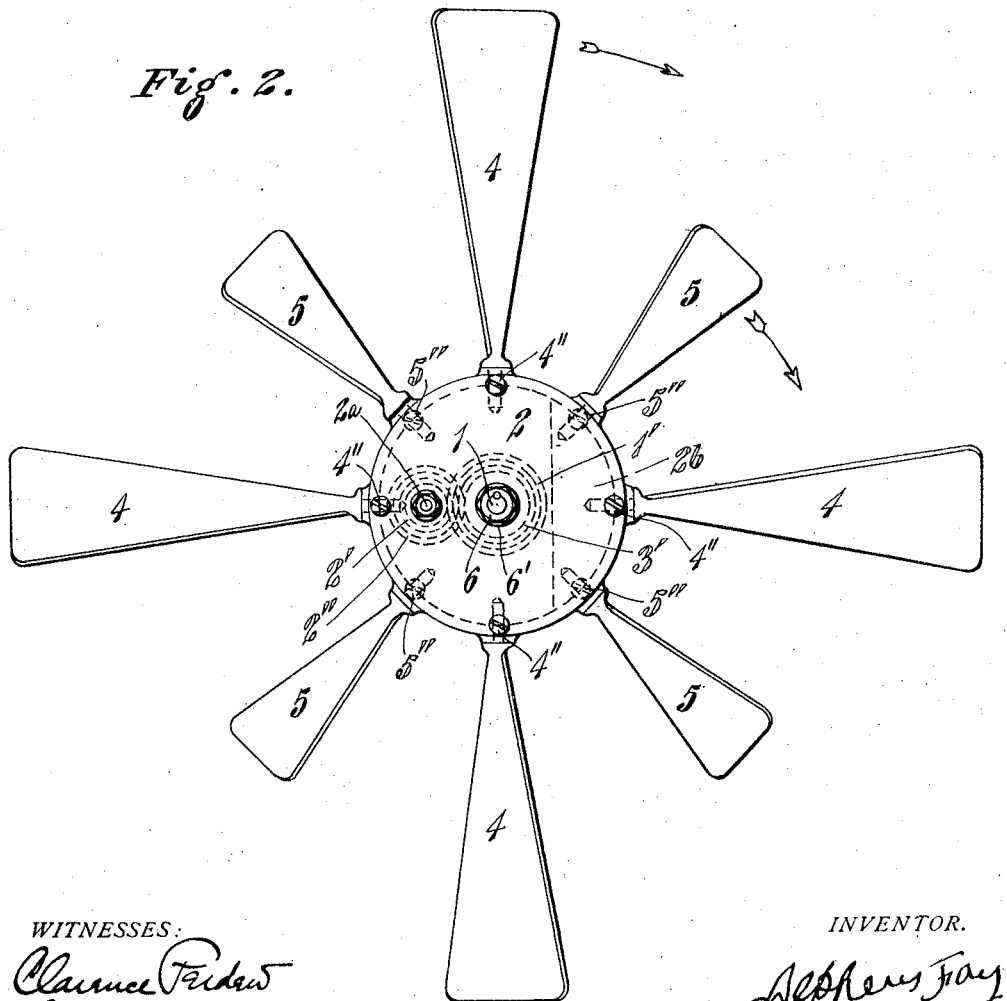
Figure 5:
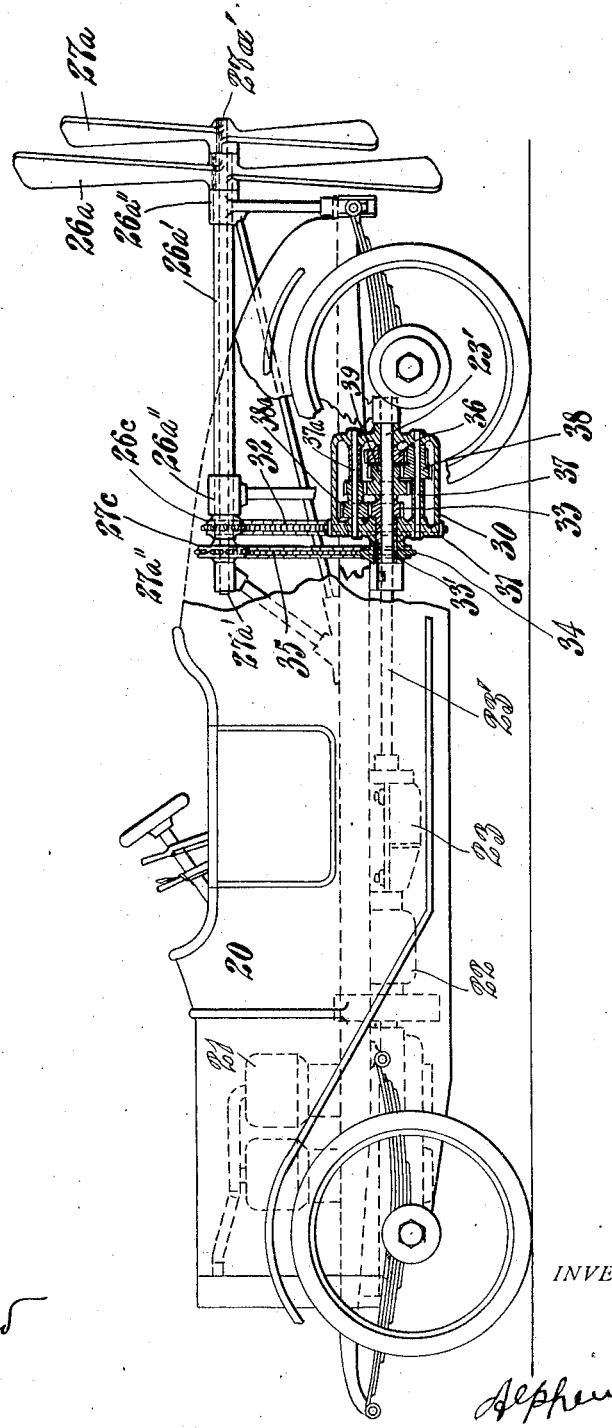

In the drawings Figure 1 is a vertical sectional elevation of a device embodying my invention in the form of a rotary fan. Fig. 2 is a bottom plan view of the same. Fig. 3 is a side elevation of a motor vehicle with my invention applied thereto in the form of vanes acting against the atmosphere, as a locomotive means for the vehicle. Fig. 4 is a side elevation of a motor vehicle equipped with a device similar to the equipment illustrated in Fig. 3, but with its position varied therefrom. Fig. 5 is a side elevation of a motor vehicle embodying modifications of the equipment illustrated in Fig. 3. Fig. 6 is a side elevation of a motor boat, in which my invention is embodied in the form of vanes acting upon the atmosphere as a locomotive means for the boat. Fig. 7 illustrates a modification of the same. Fig. 8 is a side elevation of the after part of a motor boat in which my invention is embodied in the form of vanes or propellers acting in the water as a locomotive means for the boat. Fig. 9 is a vertical section of the propellers and the gears constituting my invention as embodied in the boat illustrated in Fig. 8. Fig. 10 is a side elevation of a boat embodying a modification of the application illustrated in Fig. 8. Fig. 11 is a detail side elevation of the vanes or propellers of the boat illustrated in Fig. 10. Fig. 12 is a vertical section of the gears used to drive the propellers in the boat illustrated in Fig. 10.

The object of my invention is most fully attained by the use of correlated variably acting members exemplified in the fan as illustrated in Figs. 1 and 2 of the drawings. In this fan, the shaft 1, which is the driving shaft therefor, has a gear 1' rigidly mounted thereon adjacent to the member 2, and the member 2 has a stud 2ª rigidly mounted thereon upon which turn two gears 2' and 2", concentric with each other and rigidly secured together as illustrated. As is in most instances preferred, the gear 1' is of twice the diameter of the gear 2'. The member 2 has a counter-balance 2ᵇ for the stud 2ª and gears 2' and 2". The other member 3 has a gear 3' rigidly attached thereto and concentric therewith, and this gear 3' is in mesh with the gear 2". The gears 2" and 3' are always of equal diameter. The member 2 and the member 3 both rotate loosely on the shaft 1. From the above description it will be seen that when the shaft 1 is rotated and the gear 1' rotates therewith, it will act on the gear 2', and therethrough to the gear 2", which will act on the gear 3', and therethrough to the member 3; thus the only means for rotating the member 3 under the action of the shaft 1 is with the member 2 as a means for providing the reaction. With the member 2 free to rotate, the motion of the shaft 1 will be divided between the two members 2 and 3 in proportion to the respective resistances encountered by said members.

The resistances to be encountered by the two members 2 and 3 in this instance comprise the movement of a certain volume of air by each of the members, through the action of their vanes comprising blades 4 and 5, respectively. As illustrated, the blades 4 on the member 2 are longer than the blades 5 on the member 3 in such proportion, with respect to the pitch of the two sets of blades, that the capacity of the vane constituted by the set of blades 4 on the member 2 is substantially two times that of the vane constituted by the set of blades on the member 3. Thus, when the shaft 1 is rotated, the member 3 with its shorter blades 5 will rotate twice as fast as will the member 2 with its longer blades 4. Such proportion between the speeds of rotation of the two members exactly corresponds with the ratio between the gears 1' and 2', and thus arranged, the wear on the gears is minimized. However it will be understood that the two gears will adjust themselves in speed of rotation to the resistances encountered, whatever the proportion may be between the respective vanes carried by them, or whatever the ratio may be between the gears 1′ and 2′ used in driving the members. The capacity of either vane may be varied also by changing the pitch of the blades 4 or 5 by rotating them in either direction in their sockets 4′ and 5′, respectively, in which they are held by means of set screws 4″ and 5″, respectively. It will also be understood that the blades 4 and 5 may be removed and longer or shorter blades substituted for either of them. As here designed, the fan is suspended by the driving shaft 1, and the members 2 and 3 are held thereon by means of a nut 6 and washer 6′ on the end of shaft 1, the member 2 being lowermost, adjacent to the washer 6′, and rotating thereagainst.

Another advantage of the use of vanes of different diameters rotating concentric to each other, as do the vanes in the fan illustrated in Figs. 1 and 2 of the drawings, is that the smaller vane composed of the blades 5 acts throughout a region in which the larger vane composed of the blades 4 is less active owing to the low lineal velocity of the blades 4 in this region. The lesser vane, rotating at a high speed and under the conditions allowed in combination with the equalizing gears, performing an amount of work equal to that of the larger vanes will afford a more uniform action upon the area throughout the circular region in which the fan operates, since the small vane will be performing its work in the region adjacent to the center, while the large vane will be performing its work in the region around the outer part of the circle.

In Fig. 3 a vehicle 20 with an engine 21 and suitable clutch 22 and transmission 23 has a wheel 23$^a$ on a transmission shaft 23′, which wheel is preferably a sprocket wheel. A propeller shaft 24 is mounted in bearings 24′ on standards 24$^a$ at the rear of the vehicle, said shaft running parallel to the transmission shaft 23′. A wheel 24$^b$ is mounted on the shaft 24, this wheel preferably being a sprocket wheel, and the belt or sprocket chain 25 passes around the wheel 23$^a$ and the wheel 24$^a$, so that the transmission shaft may drive the propeller shaft. One member 26 carries the larger vane 26$^a$ and the other member 27 carries the smaller vane 27$^a$, which vanes, rotating at speeds proportional to the resistances encountered by them, act upon the atmosphere to drive the vehicle.

In the modification illustrated in Fig. 4 of the drawings the vanes 26$^a$ and 27$^a$ are mounted on the members 26 and 27 in the manner illustrated in Fig. 3, but the shaft 24$^c$, on which these members are mounted, terminates shortly forward of the vanes and has a bevel gear 24$^d$ thereon between its bearings 24$^{c'}$ in the standard 24$^{a'}$ on the rear end of the vehicle. Another shaft 28 inclines downwardly forwardly of the vehicle and has a bearing 28″ on the frame of the machine forwardly. It has a bevel gear 28$^a$ at the rear in mesh with the bevel gear 24$^d$ and it has a bevel gear 28$^b$ in mesh with the bevel gear 23$^c$ on the transmission shaft 23′. The shaft 24$^c$ on which the vanes are mounted inclines downwardly rearwardly on the machine so that the action of the machine is directed downwardly and the air put in motion thereby is adapted to coact with the ground over which the vehicle is driven and thus gain resistance therefrom to produce additional reaction for the vanes and more efficiently drive the vehicle.

The vehicle illustrated in Fig. 5 is provided with vanes 26$^a$ and 27$^a$ mounted on a sleeve 26$^{a'}$ and a shaft 27$^{a'}$ respectively. The sleeve 26$^{a'}$ has bearings 26$^{a''}$ and the shaft 27$^{a'}$ has a bearing 27$^{a''}$ forwardly. Between the bearing 27$^{a''}$ and the adjacent bearing 26$^{a''}$ are two sprocket wheels 26$^c$ and 27$^c$ mounted on the sleeve 26$^{a'}$ and the shaft 27$^{a'}$ respectively. The transmission shaft 23′ carries a drum 30 keyed to the shaft, which bears directly thereon at the rear, and forwardly has a sprocket 31 around which a chain 32 passes and which also passes around the sprocket wheel 26$^c$ on the sleeve 26$^{a'}$, the sprocket 31 on the drum 30 being considerably larger in diameter than is the sprocket wheel 26$^c$. The gear wheel 33 is loosely mounted on the transmission shaft 23′ and has a sleeve 33′ extending through the forward end of the drum and forming a bearing therewith, and on which, outside of the drum, a sprocket wheel 34 is rigidly mounted. A sprocket chain 35 passes around the sprocket wheel 34 and around the sprocket wheel 37$^c$ on the shaft 27$^{a'}$. A gear wheel 36 is rigidly mounted on the transmission shaft 23′ inside the drum 30 at the rear end thereof, and the drum carries two reactive shafts 37 and 37$^a$ parallel to the transmission shaft 23′ upon which are mounted, respectively, differential gears 38 and 38$^a$ which mesh, respectively, with the gear 36 and the gear 33, the gear 38 having its smaller member in mesh with the gear 36 and the gear 38$^a$ having its larger member in mesh with the gear 33. Between the larger member of the gear 38 and the smaller member of the gear 38$^a$ is interposed a differential gear 39 loosely mounted on the driving shaft 23′ and having its smaller member in mesh with the larger member of the gear 38, and its larger member in mesh with the smaller member of the gear 38$^a$. From the foregoing it will be seen that with the drum 30 carrying the intermediate shafts 37 and 37$^a$, which are the fulcrums for the transmission of power from the transmission shaft 23′ to the shaft 27ᵃ′ and the sleeve 26ᵃ′, on which the vanes are mounted, the requirement for differential action of the two vanes is fulfilled and the transmission of the reaction therebetween is balanced, due to the opposed relation of the transmission gears on the intermediate shafts for carrying the power from the driving gear 36 to the gear 33 with the sleeve which rotates the shaft 27ᵃ′. The rotation of the drum 30 due to this balanced reaction rotates the sleeve 26ᵃ′. The larger vane 26ᵃ being on the sleeve and driven by the drum 30 will rotate at a slower speed than does the smaller vane 27ᵃ which is rotated from the gear 33 driven through the train of gears inside the drum from the transmission shaft 23′.

The motor boat illustrated in Fig. 6 is equipped with vanes in the same manner as is the motor vehicle illustrated in Fig. 3 with the exception that the vanes 26ᵃ and 27ᵃ are driven directly through their gears 26 from the engine 21ᵃ by a continuous shaft 40 which inclines upwardly from the engine to the vanes and is connected to the engine by means of a universal joint 40′. This allows the engine to be mounted horizontally in the boat, and allows of a simple arrangement of the parts, but the action of the vanes is directed upwardly. This somewhat reduces the efficiency of the vanes as propellers but has the effect of depressing the stern of the boat and lifting the bow thereof with some advantage.

The boat illustrated in Fig. 7 has the engine 21ᵃ mounted in the stern, and the vanes 26ᵃ and 27ᵃ and their gears 26 are mounted on a horizontal shaft 24ᵉ which has a wheel 24ᶠ. The engine 21ᵃ has a wheel 23ᶠ and a suitable belt or chain 25ᶠ passes around the wheels 24ᶠ and 23ᶠ, so that the vanes are driven in exactly the same manner as are those on the motor vehicle illustrated in Fig. 3.

The boat illustrated in Figs. 8 and 9 has the propeller shaft 41 inclined downwardly toward the stern of the boat, passing through the bottom of the boat in the well known manner, and mounted in bearings 41″ under the boat, as illustrated. To the rear of the bearing 41″ the members 42 and 43 are loosely mounted on the shaft and carry the vanes or propellers 44 and 45 respectively, as is best illustrated in Fig. 9. The member 43 is so reduced that it consists simply in a sleeve integral with the gear 43′ which corresponds to the gear 3′ hereinbefore described, while the member 42 is developed into a casing completely surrounding the gears and forming a water-tight inclosure therefor. The gear 41′ is keyed on the propeller shaft and the gears 42′ and 42″ turn on a pin 42ᵃ which passes through the casing comprised by the member 42, from one side to the other, having a head at one end and receiving a screw 42ᵃ′ in its other end. The counter-balance 42ᵇ receives a screw 42ᵇ′ and these screws 42ᵃ′ and 42ᵇ′ hold together the two sections 42ᶜ and 42ᶜ′, into which the casing is divided. The section 42ᶜ bears on the elongated hub 41″ with which the gear 41′ is provided, and the vane or propeller 44 is keyed on to the hub 42ᶜ″ of this section 42ᶜ. The other section 42ᶜ′ of the casing bears on the member 43 and outside the casing the smaller vane or propeller 45 is keyed on to this member 43. As illustrated, the two vanes or propellers 44 and 45 are so proportioned that the one will have substantially twice the capacity of the other, and as geared together, the vane or propeller 45 will rotate substantially twice as fast as does the vane or propeller 44 under the action of the propeller shaft 41, with the results hereinbefore described.

The boat illustrated in Figs. 10 to 12 inclusive has the gears located inside the boat adjacent to the engine and a propeller sleeve 41ᵃ and propeller shaft 41ᵃ′ inside said sleeve extend downwardly through the bottom of the boat, and have bearings 41ᵇ and 41ᵇ′ under the boat. The sleeve 41ᵃ carries the large vane or propeller 44ᵃ and the shaft 41ᵃ′ carries the small vane or propeller 45ᵃ. In this instance the engine 50 has its crank shaft 51 provided with a gear 51′ rigidly keyed thereon while the member 52 takes the form of a casing for the gears and bears on the crank shaft 51 between the gear 51′ and the bearing 50′ of the crank shaft in the engine 50. This casing is divided into sections 52ᶜ and 52ᶜ′, the latter section comprising the bearing on the crank shaft, while the other section 52ᶜ has a hub 52ᶜ″ which is keyed onto the sleeve 41ᵃ that carries the large vane or propeller 44ᵃ. The sections 52ᶜ and 52ᶜ′ are held together by bolts 52ᵃ and 52ᵃ′, passing through the casing comprised by said sections, from one side to the other. The bolt 52ᵃ forms the pin on which the gears 52′ and 52″ are mounted and the bolt 52ᵃ′ passes through the counter-balance 52ᵇ that forms part of the section 52ᶜ. The other member of the gearing is here present merely in the form of the gear 53 keyed on the shaft 41ᵃ′, with the gear 52″ in mesh therewith and of diameter equal thereto. This arrangement has the advantage of eliminating the slight obstacle which the gears and their casing present when carried in the water under the boat, and also avoids the necessity of constructing them with a water-tight casing, but it will be understood that the construction illustrated in Figs. 10 to 12 inclusive may be equally water-tight, and that a water-tight arrangement is also desirable when the gears are carried inside the boat. The manner of operation will be the same in both instances and the advantages resulting therefrom will be the same as hereinbefore described in connection with the other examples of application of my invention.

It will be understood that the principle is applicable to such devices as wind wheels or water wheels or any other form of motor designed to be acted upon by a moving body to utilize the motion thereof to perform work.

Having fully described the principle of my invention and exemplified it by certain devices specifically illustrated and described, it will therefore be understood that I do not limit myself to such specific illustrations and descriptions, but what I claim as new and desire to secure by Letters Patent is:

1. A mechanical movement comprising two vanes, compensating means whereby the speed of either of said vanes is dependent upon the resistance imposed upon the other vane, a driving shaft for said compensating means extending continuously through said compensating means, and a bearing for said driving shaft.

2. A mechanical movement comprising two vanes, compensating means between said vanes whereby both vanes are driven in the same direction, a driving shaft for said compensating means extending continuously through said compensating means, and a bearing for said driving shaft.

3. In a mechanical movement a driving shaft, a bearing for said driving shaft, a gear thereon, a sleeve on the gear extending therefrom toward the end of the shaft, by means of which the gear is secured to the shaft, another gear loose on the shaft, adjacent the first gear, a sleeve on this gear extending in the opposite direction, an operative member mounted on said sleeve, for performing work, a casing surrounding the gears and journaled on their respective sleeves, another operative member mounted on the casing, for performing work, and gears in the casing, carried thereby, planetary to the gears on the shaft, the gears on the shaft, and the planetary gears, being, respectively, of different diameters, but each two that co-act being complementary to the other two.

4. In a mechanical movement, a driving shaft, a bearing for said driving shaft, a sleeve telescoping the shaft, and a second sleeve telescoping that sleeve, a third sleeve telescoping the shaft and loose thereon, the first sleeve being tight on the shaft and the second one being loose on the first, operative members mounted on the second and third sleeves, and operative connection from the first sleeve to each of the other sleeves whereby resistance on the operative member of either sleeve provides the reaction for the action of the member on the other sleeve.

5. In a mechanical movement, a driving shaft, a bearing for said driving shaft, a gear tight thereon, said shaft having space between the gear and the end of the shaft, another gear loose on the shaft, at the other side of said tight gear from said space, an operative member tightly connected to said other gear, a casing inclosing the gears and journaled concentric with the shaft, another operative member tightly connected to the casing, and operative connection carried by the casing whereby said gears on the shaft co-act to drive said operative members and whereby each of the members provides the reaction for the action of the other.

6. A propelling mechanism for ships comprising in combination a propeller shaft and bearings for said shaft, compensating means carried upon said propeller shaft, multiple propellers mounted for rotation about said propeller shaft, and operative means connecting said propellers with said compensating mechanism to drive all of said propellers in the same rotative direction.

7. In a propulsion mechanism, the combination of a propeller shaft and bearings for said shaft, propellers mounted for rotation about said propeller shaft, rotative compensating means carried by said propeller shaft, and operatively connected with each of said propellers to drive all of said propellers in the same rotative direction, substantially as described.

ALPHEUS FAY.

Witnesses:
CLARENCE PERDEW,
CHAS. J. FURBER.